US009697295B1

United States Patent
Nijim et al.

(10) Patent No.: US 9,697,295 B1
(45) Date of Patent: Jul. 4, 2017

(54) URL MONITOR WITH TRICK MODE HANDLING

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US)

(73) Assignee: COX COMMUNICATIONS, INC, Atlanta, GA (US)

( * ) Notice: Subject to any disclaimer, the term of this patent is extended or adjusted under 35 U.S.C. 154(b) by 109 days.

(21) Appl. No.: 14/601,066

(22) Filed: Jan. 20, 2015

(51) Int. Cl.
| | |
|---|---|
| G06F 17/30 | (2006.01) |
| H04N 21/236 | (2011.01) |
| H04N 21/658 | (2011.01) |
| H04N 21/858 | (2011.01) |
| H04N 5/783 | (2006.01) |
| H04N 21/2387 | (2011.01) |
| H04N 21/6587 | (2011.01) |
| H04N 21/234 | (2011.01) |
| H04N 21/24 | (2011.01) |
| H04N 21/442 | (2011.01) |
| H04N 21/454 | (2011.01) |
| H04N 21/81 | (2011.01) |
| H04N 21/472 | (2011.01) |

(52) U.S. Cl.
CPC ....... *G06F 17/30876* (2013.01); *H04N 5/783* (2013.01); *H04N 21/2387* (2013.01); *H04N 21/23424* (2013.01); *H04N 21/23614* (2013.01); *H04N 21/2407* (2013.01); *H04N 21/44222* (2013.01); *H04N 21/454* (2013.01); *H04N 21/47202* (2013.01); *H04N 21/6581* (2013.01); *H04N 21/6587* (2013.01); *H04N 21/812* (2013.01); *H04N 21/8586* (2013.01)

(58) Field of Classification Search
None
See application file for complete search history.

(56) References Cited

U.S. PATENT DOCUMENTS

| | | | | |
|---|---|---|---|---|
| 8,625,974 | B1 * | 1/2014 | Pinson | 386/350 |
| 9,374,630 | B1 * | 6/2016 | Nijim | H04N 21/8586 |
| 2002/0016965 | A1 * | 2/2002 | Tomsen | G06Q 10/10 |
| | | | | 725/42 |
| 2002/0144262 | A1 * | 10/2002 | Plotnick | G11B 27/005 |
| | | | | 725/32 |
| 2002/0194592 | A1 * | 12/2002 | Tsuchida | H04H 20/10 |
| | | | | 725/32 |

(Continued)

*Primary Examiner* — Nathan Flynn
*Assistant Examiner* — Alexander Q Huerta
(74) *Attorney, Agent, or Firm* — Merchant & Gould

(57) ABSTRACT

A uniform resource locator (URL) monitoring system and method employs rules for dynamically managing URLs associated with streamed video content. The system monitors the content stream for URLs and, when a URL is detected, applies the rules to determine how to handle the URL. The system may disable selected trick modes to prevent additional content from being skipped. Alternatively, the system may display the URL while a trick mode is active and, if the URL is followed, suspend the trick mode and show the additional content. URLs encountered during trick modes may be captured and the URL or additional content presented when normal playback resumes. Additionally, the system may determine whether to fit saved URLs around other URLs later in the content stream, display saved URLs simultaneously with the later URLs, or replace the later URLs with the saved URLs based on the handling rules.

20 Claims, 8 Drawing Sheets

(56) References Cited

U.S. PATENT DOCUMENTS

| | | | |
|---|---|---|---|
| 2003/0037068 A1* | 2/2003 | Thomas | H04N 5/76 |
| 2004/0133909 A1* | 7/2004 | Ma | G06Q 30/0207 |
| | | | 725/34 |
| 2004/0158858 A1* | 8/2004 | Paxton | H04N 7/17336 |
| | | | 725/42 |
| 2005/0188408 A1* | 8/2005 | Wallis | H04N 5/4401 |
| | | | 725/87 |
| 2007/0106651 A1* | 5/2007 | Isaacson | G06K 9/627 |
| 2008/0098433 A1* | 4/2008 | Hardacker | H04N 7/163 |
| | | | 725/52 |
| 2009/0177528 A1* | 7/2009 | Wu | G06Q 30/02 |
| | | | 705/14.44 |
| 2009/0313122 A1* | 12/2009 | Funk | G06Q 30/02 |
| | | | 705/14.53 |
| 2009/0317053 A1* | 12/2009 | Morley | H04N 5/783 |
| | | | 386/343 |
| 2010/0218208 A1* | 8/2010 | Holden | G11B 27/00 |
| | | | 725/32 |
| 2011/0093879 A1* | 4/2011 | Salkind | G06Q 30/02 |
| | | | 725/23 |
| 2013/0198642 A1* | 8/2013 | Carney | G06F 3/0484 |
| | | | 715/738 |
| 2014/0020017 A1* | 1/2014 | Stern | H04N 21/23611 |
| | | | 725/34 |
| 2014/0156364 A1* | 6/2014 | Zalewski | H04N 5/147 |
| | | | 705/14.4 |
| 2016/0080829 A1* | 3/2016 | Biber | G11B 27/105 |
| | | | 725/32 |

* cited by examiner

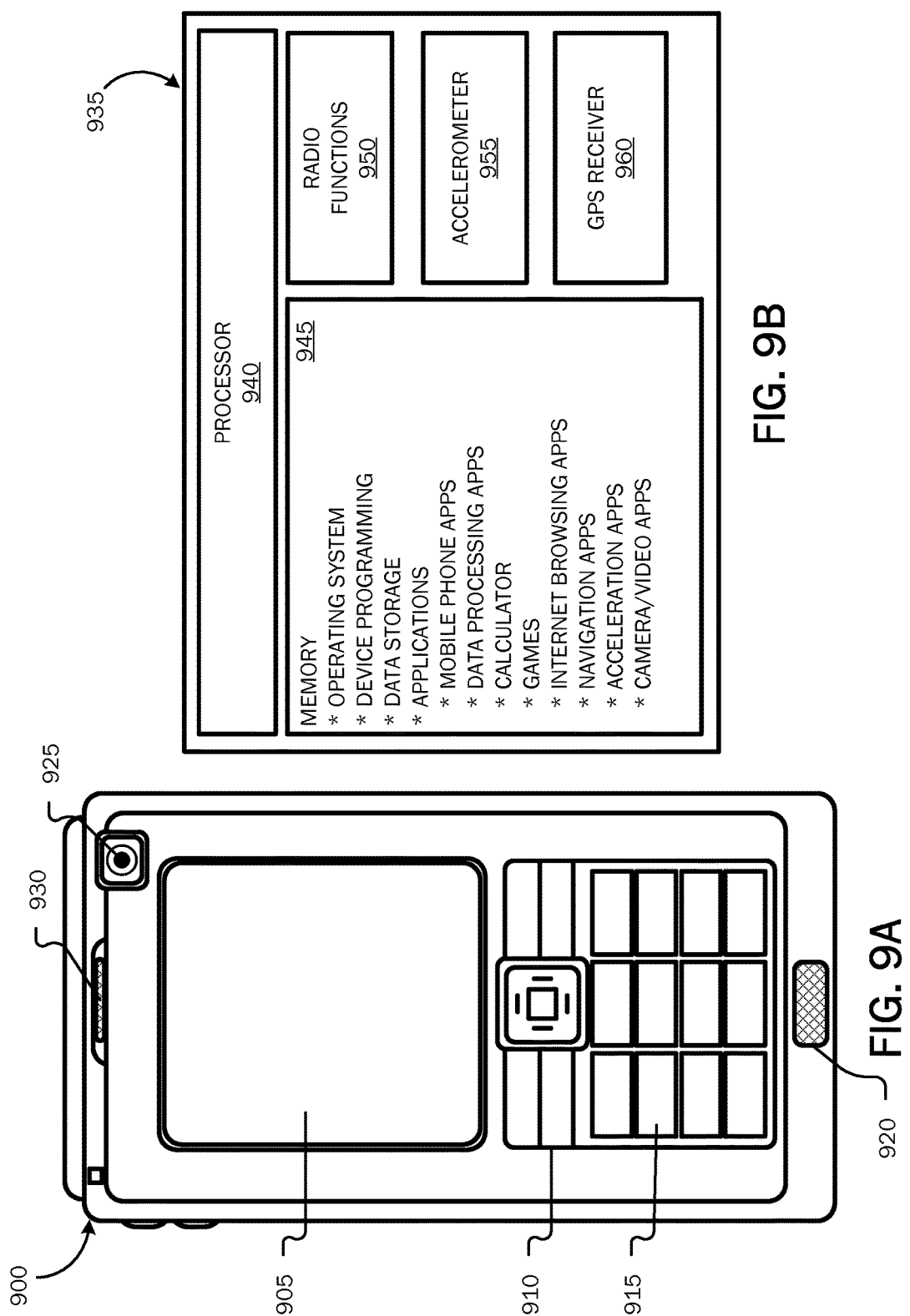

URL MONITOR WITH TRICK MODE HANDLING

BACKGROUND

A growing number of customers choose to view television shows, movies, and other video content streamed to various consumer electronic devices, such as tablets and smartphones, because they like more control over when, where, and how video content is experienced. Even when using more conventional set-top boxes and televisions, customers regularly take advantage of video on demand (VOD) and time shifting devices (e.g., digital video recorders) to watch video content on their own schedules. Consistent with the desire for greater control, customers are accustomed to being able to pause, rewind, and fast forward video content, even when watching "live" (i.e., linear) television.

Customers have also embraced interactive television, which offers a more immersive and enjoyable experience. Interactive television adds data services to traditional television technology. For example, interactive television may allow customers to obtain additional information related to the video content being watched. Interactive television may also be used for advertising and may allow television service providers to offer targeted advertising services.

Giving customers the control they desire is sometimes in conflict with the business realities of those supplying the video content, such as television service providers, television networks, and advertisers. For example, advertisers recognize that the ability to fast forward video content potentially allows customers to skip advertisements, which may reduce the value of advertising. However, limiting the control customers are given when viewing video content may result in poor customer experience. It is with respect to these and other considerations that the present invention has been made.

BRIEF SUMMARY

Aspects found in various implementations of the present invention provide for dynamically managing the presentation of linked content from URLs transmitted with the content stream in relation to the operation of trick modes when showing streamed video content. The URL monitoring system includes a video content server in communication with a link manager. Generally, the video content server streams video content items to one or more endpoint devices addressable over an internet protocol network. The link manager may be in communication with one or more data stores, such as, but not limited to, a URL data store, a video content item data store, and various business data stores. In various embodiments, a recommendation system in communication with business data stores may automatically select recommended video content items based on information known about the customer, such as past viewing history and customer-provided interests and hobbies. In operation, the link manager associates linked content residing on linked content servers with video content items via one or more URLs.

The endpoint device includes a content viewer for rendering video content items and linked content in one or more display regions that are presented on the display. The content viewer provides playback controls allowing users to select various presentation modes, including trick modes and normal playback, for seeking within and viewing video content items. The endpoint device allows customers to request a video content item from the television service provider or other content source, receive the video content item, playback the video content item, manipulate the playback using trick modes, and view linked content associated with the video content item. The resulting interactive viewing experience may include a blend of video content items with linked content from the television service provider or third party content owners or providers.

A URL monitor detects URLs in the content stream and manages presentation of the links or linked content associated with the detected URLs in relation to the trick modes of the endpoint device. The URL monitor is generally in communication with the endpoint device and, optionally, some or all of the components of the URL monitor are incorporated into the endpoint device. The URL monitor includes a receiver, a memory, a link processor, a reporting component, and an optional attention monitor.

The receiver receives a content stream from a source, such as, but not limited to, the video content server of the television service provider or a digital video recorder (local or remote). The memory stores and tracks information used by components of the URL monitor. The memory is optionally configured with one or more memories, such as, but not limited to, a rule memory, a link object memory, and a content buffer. The rule memory holds business rules or other decision criteria applied by the URL monitor to evaluate the link object type, parse and utilize link object parameters, and select the proper link handling operations described herein. The link object memory holds information about detected and skipped link objects. The content buffer temporarily stores the received content stream to provide time shifting functionality, which enables the use of trick modes with live content streams.

On the client-side, the link processor identifies link objects in the content stream metadata and determines whether special handling of the link object is indicated based on the application of business rules to the link object parameters, monitors the active playback mode, maintains the current view session state, detects whether link objects have been skipped via a trick mode, and forces display of selected types of link objects (e.g., trickable and mandatory link objects). More specifically, the link processor is configured to perform functions such as determining the type of link object, determining the properties associated with the link object, evaluating the view session state, selecting appropriate link object handling based on the link type and view session state, monitoring the active playback mode, detecting and copying link objects skipped via a trick mode, and forcing display of selected link objects. Additionally, the link processor automatically controls the current presentation mode for the video content item, configures the functionality of the playback controls, and changes the configuration of the display regions of the content viewer based on the link object type, the view session state, and/or other parameters in accordance with the business rules.

The reporting component communicates with the link manager or other server-side components of the URL monitoring system. In turn, the link manager or other server-side component of the URL monitoring system uses the information provided by the reporting component for purposes such as determining whether to relocate skipped link objects in the video content item following trick mode usage and selecting substitute URLs to use in place of skipped URLs according to the business rules.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views:

FIGS. 9A-B illustrate a suitable mobile computing environment with which embodiments of the system described herein may be practiced.

DETAILED DESCRIPTION

A uniform resource locator (URL) monitoring system and accompanying method are described herein and illustrated in the accompanying figures. The system employs rules for dynamically managing URLs associated with streamed video content. The system monitors the content stream for URLs and, when a URL is detected, applies the rules to determine how to handle the URL. The system may disable selected trick modes to prevent linked content from being skipped. Alternatively, the system may display the URL while a trick mode is active and, if the URL is followed, suspend the trick mode and show the linked content. URLs encountered during trick modes may be captured and the URL or linked content presented when normal playback resumes. Additionally, the system may determine whether to fit saved URLs around other URLs later in the content stream, display saved URLs simultaneously with the later URLs, or replace the later URLs with the saved URLs based on the handling rules.

Figure 1:
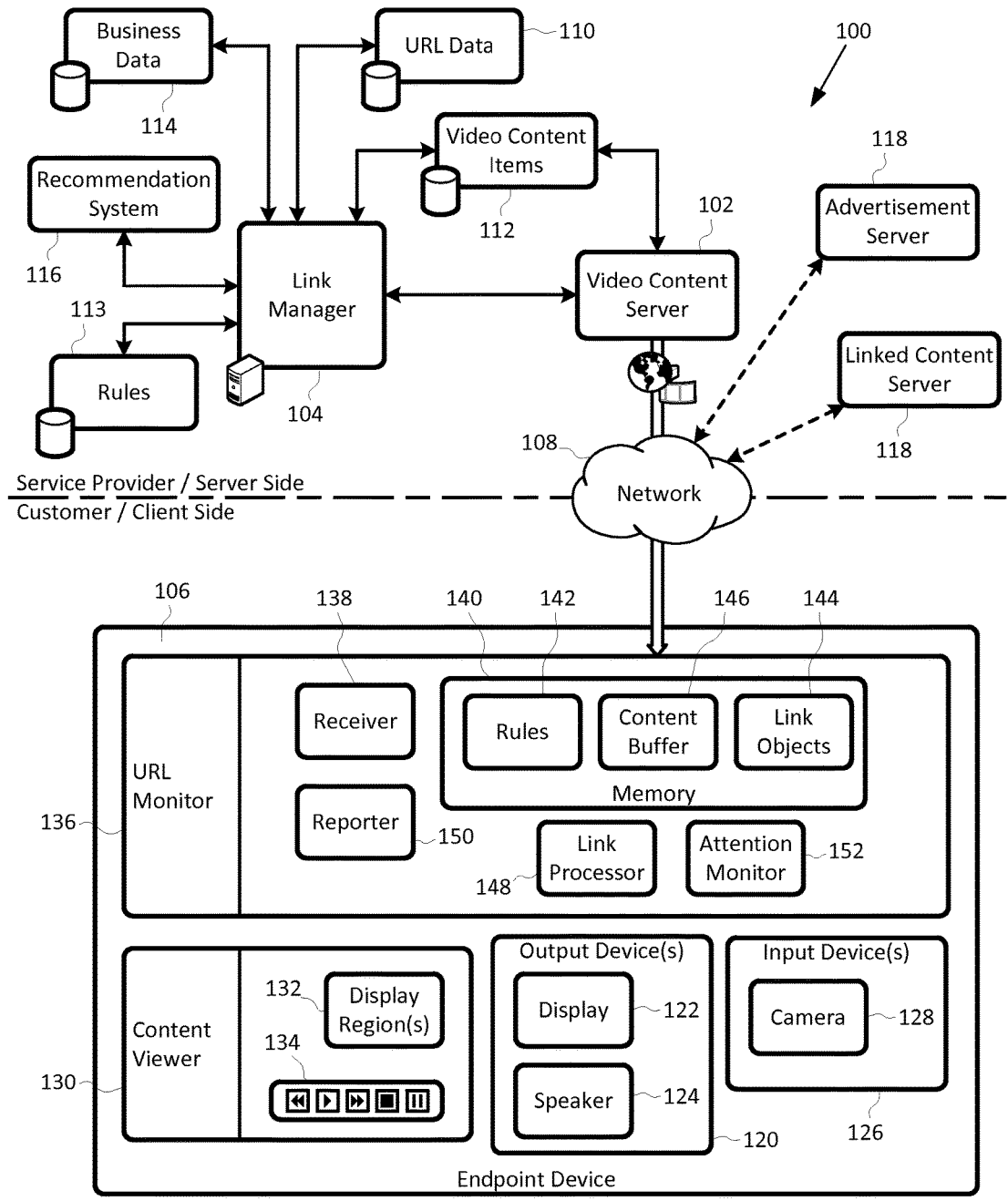
FIG. 1 is a simplified block diagram of one embodiment of a uniform resource locator (URL) monitoring system.

FIG. 1 is a simplified block diagram of one embodiment of a URL monitoring system for dynamically managing the presentation of linked content from URLs transmitted with the content stream in relation to the operation of trick modes when showing streamed video content. Trick modes refer to presentation modes allowing forward or backward movement through digital video while emulating the visual effect of fast forward or rewind. As used herein, trick modes broadly encompass any presentation mode other than forward playback at normal speed, such as, without limitation, fast forward, rewind, pause, stop, next, and previous.

The URL monitoring system 100 allows a television service provider to associate linked content with the programming to provide an immersive, interactive television viewing experience. Examples of television service providers include providers of programming, such as, but not limited to, multiple system operators, cable system operators, direct-to-home (DTH) or direct broadcast satellite (DBS) operators (i.e., satellite system operators), terrestrial (i.e., over-the-air) broadcast system operators (e.g., networks and stations), Internet protocol television (IPTV) system operators, and Internet television system operators, and Internet service providers.

The URL monitoring system 100 includes a video content server 102 in communication with a link manager 104. Generally, the video content server 102 streams video content items to customer endpoint devices 106. As used herein, a video content item broadly encompasses any video content or audiovisual content including, but not limited to, one or more live or pre-recorded programs which may be streamed as linear or non-linear (i.e., on-demand) programming by a television service provider or other content provider as well as programs recorded by a customer using a digital video recorder (DVR) or other time-shifting device. Content streams may be buffered to facilitate pause "live" television and other trick play functionality for content streams received from the television service provider or other content provider.

In various embodiments, the video content items and link objects are sent by the television service provider to one or more endpoint devices 106 addressable over an internet protocol network 108. Networks suitable for use with the URL monitoring system 100 may include, but are not limited to, one or more of a television service provider content delivery network, the Internet, a wide area network, and a local area network. Examples of suitable endpoint devices 106 include, but are not limited to, digital set-top boxes, personal computers, tablet computing devices, smart phones, smart televisions, digital media players, and video game consoles.

The link manager 104 may be in communication with one or more data stores, such as, but not limited to, a URL data store 110, a video content item data store 112, a rule data store 113, and various business data stores 114. The optional URL data store 110 hold information relating to the URLs associated with video content items. The video content item data store 112 stores the video content items that are streamed by the video content server 102. The rule data store 113 holds business rules or other decision criteria applied by the link manager 104 to determine whether to copy link objects skipped using trick modes to new positions within the video content item and whether to substitute personalized link objects for skipped link objects. The business data stores 114 maintained by the television service provider hold customer profiles containing information voluntarily provided by customers or collected in the ordinary course of business, such as, without limitation, billing data (e.g., residence address), demographic data (e.g., age and gender), preferences and interests (e.g., hobbies, preferred program genres, program ratings, etc.), historical activity information (e.g., on-demand content viewed/purchased), which may be retrieved using the customer identifier.

In various embodiments, a recommendation system 116 in communication with business data stores 114 may automatically select recommended video content items based on information known about the customer, such as past viewing history and customer-provided interests and hobbies.

In operation, the link manager 104 associates linked content residing on linked content servers 118 with video content items via one or more URLs. Examples of the types of linked content that may be referenced by a URL include, without limitation, supplemental information related to a program, advertising, and emergency alerts. The linked content may be provided by the content provider, an advertiser, or other entity. Linked content may be in the form of, but not limited to, web pages or content streams. For convenience, the term "link object" is used to refer to any data structure containing or representation of a URL or collection of URLs, together with any associated data elements or properties that is associated with the video content item and transmitted with the content stream.

As described below, the optional properties or parameters provide additional information about the URL and/or the linked content that are used when processing the URL. Some link objects contain the actual URLs that point directly to the linked content and any associated properties. Other link objects contain generic URLs that point to a location where the actual URL(s) and any associated properties are stored. For example, general URLs may point to locations in the URL data system 110.

The link object associates one or more URLs with an aspect of the content stream, including, without limitation, a particular video content item (i.e., a program) or the channel carrying the program. The link object may be persistent for the duration of the content stream or limited to portions of the content stream (e.g., specific scenes within the content stream). The URLs allow customers to access additional content (e.g., video, audio, data, etc.) associated with the video content item and may display the additional content in various ways according to the capabilities of the endpoint devices being used. The URLs may also be used for targeted advertising based on the session profile, which may include, without limitation, information about the customer, the capabilities of the endpoint device 106, and options configured in the user agent of the endpoint device 106.

The link manager 104 inserts the link objects into metadata associated with the content stream or other locations associated with the content stream. In one exemplary implementation, one or more URLs are associated with positions (e.g., time stamps or frames) in the content stream. The link manager 104 stores link objects representing the URLs and the corresponding positions in one or more manifest files that are sent with the content stream to the endpoint device 106. In an alternate implementation, the link manager 104 injects link objects representing the URLs at the corresponding positions in the metadata of the content stream or other data stream coinciding with the content stream. Other techniques for implementing associations between the URLs and the content stream may be used.

The linked content associated with a video content item may be selected by the television service provider or by third parties, such as content providers (i.e., television networks and stations) and advertisers. The television service provider may offer third parties the option to request and/or purchase an association between a URL and a video content item. For example, a television network might choose to associate the URL for the home page of the television network with all channels and programs offered by the television network. The television network might also choose to associate the URL for a web page dedicated to a program and maintained by the television network with the program and the URL for a trailer to a new program in which viewers may be interested. Advertisers may choose to associate URLs pointing to commercials, trailers, web pages, or other additional video content or other electronic print advertisements promoting a products or services with particular channels or programs. The television service provider may provide URLs to other video content items offered by the television service provider.

The endpoint device 106 includes one or more output devices 120, such as a display 122 and speakers 124 and one or more input devices 126, such as a camera 128, allowing a user to request and consume video content items and linked content. In the illustrated embodiment, the display 122 may be configured as a touch screen to provide input functionality. Examples of other suitable input devices include touchscreens, mice, keyboards, and microphones.

The endpoint device 106 further includes a content viewer 130 for rendering video content items and linked content in one or more display regions 132 that are presented on the display 122. The content viewer 130 provides playback controls 134 allowing users to select various presentation modes, including trick modes and normal playback, for seeking within and viewing video content items.

The endpoint device 106 allows customers to request a video content item from the television service provider or other content source, receive the video content item, playback the video content item, manipulate the playback using trick modes, and view linked content associated with the video content item. The resulting interactive viewing experience may include a blend of video content items with linked content from the television service provider or third party content owners or providers.

A URL monitor 136 detects URLs in the content stream and manages presentation of the links or linked content associated with the detected URLs in relation to the trick modes of the endpoint device 106. Various aspects of the URL monitor 136 are illustrated in the exemplary implementation of FIG. 1. The URL monitor 136 is generally in communication with the endpoint device 106 and, optionally, some or all of the components of the URL monitor 136 are incorporated into the endpoint device 106, as shown in FIG. 1. The URL monitor 136 includes a receiver 138, a memory 140, a link processor 148, a reporting component 150, and an optional attention monitor 152.

The receiver 138 receives a content stream from a source, such as, but not limited to, the video content server 102 of the television service provider or a digital video recorder (local or remote).

The memory 140 stores and tracks information used by components of the URL monitor 136. The memory 140 is optionally configured with one or more memories, such as, but not limited to, a rule memory 142, a link object memory 144, and a content buffer 146.

The rule memory 142 holds business rules or other decision criteria applied by the URL monitor 136 to evaluate the link object type, parse and utilize link object parameters, and select the proper link handling operations. While described as business rules, it should be appreciated that a decision tree or other evaluation mechanism may be used to facilitate trick mode handling of link objects. Embodiments may use generalized business rule sets that are broadly applicable to a number of different link objects or link object types, customized business rule sets specifically applicable only to particular link objects or link object types, or a combination thereof.

The link object memory 144 holds information about detected and skipped link objects. Examples of the information stored in the link object memory 144 include, but are not limited to, one or more of the URL, link object type, the original position of the link object within the content stream, the new position of the link object within the content stream, the view state (i.e., whether the link object has been displayed), the skip state (i.e., whether the link object was skipped), and link object pairings (i.e., associations between a link object and a presentation mode or playback control).

The content buffer 146 temporarily stores the received content stream to provide time shifting functionality, which enables the use of trick modes with live content streams.

Examples of other information tracked by URL monitor 136 and optionally stored in the memory 140 include, but are not limited to, one or more of the user identifier, user profile data (addresses, age, gender, interests, hobbies, preferences, languages, billing history, and viewing history associated with the user), active playback mode (e.g., normal playback mode or trick mode), viewing location, viewing time, viewing date, attention state (i.e., whether the user is actively engaged with the endpoint device and/or content), endpoint device profile data (e.g., identifier, internet protocol address, media access control (MAC) address, and display capabilities of the endpoint device), and endpoint device option data (e.g., closed captioning settings, secondary audio programming settings; and parental controls associated with user identifier).

On the client-side, the link processor 148 identifies link objects in the content stream metadata and determines whether special handling of the link object is indicated based on the application of business rules to the link object parameters, monitors the active playback mode, maintains the current view session state, detects whether link objects have been skipped via a trick mode, and forces display of selected types of link objects (e.g., trickable and mandatory link objects). More specifically, the link processor 148 is configured to perform functions such as determining the type of link object, determining the properties associated with the link object, evaluating the view session state, selecting appropriate link object handling based on the link type and view session state, monitoring the active playback mode, detecting and copying link objects skipped via a trick mode, and forcing display of selected link objects.

Additionally, the link processor 148 automatically controls the current presentation mode for the video content item, configures the functionality of the playback controls, and changes the configuration of the display regions of the content viewer based on the link object type and/or other parameters, the view session state in accordance with the business rules.

The reporting component 150 communicates with the link manager 104 or other server-side components of the URL monitoring system 100. For example, the reporting component 150 reports information collected from the endpoint device, such as skipped link objects and the view session state. In turn, the link manager 104 or other server-side component of the URL monitoring system 100 uses the information provided by the reporting component 150 for purposes such as determining whether to relocate skipped link objects in the video content item following trick mode usage and selecting substitute URLs to use in place of skipped URLs according to the business rules.

The optional attention monitor 152 detects user interaction with the endpoint device 106. For example, the attention monitor 152 may monitor how recently the user has interacted with the endpoint device 106 via an input device 126 (e.g., such as detecting receipt of a inputs from a remote control, keyboard, mouse. or touch screen) and monitoring feedback from cameras detecting whether the user is actively looking at the endpoint device 106.

The various components of the URL monitoring system 100, including, without limitation, the video content server 102, the link manager 104, the endpoint device 106, the various data systems 110-114, the recommendation system 116, and the URL monitor 136, may be implemented using one or more computing devices (e.g., application servers, data servers, personal computers, tablets, smart phones, smart televisions, set-top boxes, consumer electronic devices, and other Internet-enabled computing devices) having hardware and software components configured to provide the functionality described herein.

The URL monitoring system 100 allows URLs, link objects and linked content to be classified using various type designations defined through rules and/or properties. The properties may be used to provide additional information beyond the location of the linked content. The properties may be specified in various ways, including but not limited to, being specified as URL parameters, elements of structured messages or other data structure storing content URLs or generic URLs, or descriptive metadata stored in a separate data structure but having a specified relationship to the URL. Examples of properties that may be used by the URL monitoring system 100 include, but are not limited to, identification, presentation, content type, necessity, priority, restrictions, start/end times, start/end dates, duration, description, and personalization properties.

Presentation properties may specify how linked content or selectable links are presented to the user. For example, link presentation properties may specify that links are presented as buttons or other controls in secondary display regions (e.g., a picture-in-picture window, overlay, or edge banner) on top of the video content item or displayed on an alternate page brought up in place of the video content item when the user activates a generic button or menu control. Similarly, content presentation properties specify that linked content is presented in secondary display regions (e.g., a picture-in-picture window, overlay, or edge banner) on top of the video content item or that the video content item and the linked content are presented in a split screen view. Presentation properties may also specify whether and how linked content or links are presented during certain playback modes. For example, some links may be presented only while a normal playback mode is selected for the video content item and other links may be presented even when a trick mode is selected.

Content type properties may be used to classify URLs or linked content by category or purpose (e.g., advertisements, commercials, promotions, contests, recommendations, or supplemental content).

Necessity properties may be used to specify whether the link object or linked content is deemed to be mandatory or optional. In other words, necessity properties indicate whether or not the linked content may be skipped or avoided when viewing the video content item or whether a particular link object may be replaced. For example, a commercial may be classified as unavoidable while supplemental information about the video content item may be skipped. Similarly, a mandatory URL appearing at a later position in the content stream may not be replaced by an earlier link object that was skipped by the user.

Priority properties may provide a relative importance value for the linked content URLs that may be used to determine which URLs are given preference when multiple URLs are being considered for relocation but limited time or space is available.

Restriction properties may be used to specify playback mode or user interface restrictions. For example, restriction properties may specify that some or all trick modes are disabled while the linked content is being presented.

Start, end, and duration properties may be used to specify various temporal or calendar characteristics for the link object, the linked content, or other properties, such as, without limitation, an absolute or relative start or end position (i.e., time stamp) of a link object within the content stream, the amount of time that a link is available, the duration of the linked content, or when another property applies (e.g., how long restrictions last).

In various implementations, link objects may utilize a structured markup language, such as extensible markup language (XML), or parameterization to specify properties and values. Similarly, property values are stored at specified positions in a data string. For example, whether the user may fast forward through the linked content may be indicated by a named element storing a true/false value (e.g., <skip>FALSE</skip>), a named parameter in a parameterized URL (e.g., "www.host.com\prop?skip=0"), or by the third character/bit in a data string.

Some properties may be derived or inferred from other properties using the applicable business rules. For example, necessity may be inferred from content type rather than being explicitly specified by crafting rules that determine necessity based on evaluation of the content type property. Similarly, some properties (e.g., time or date properties) may be sub-properties or otherwise incorporated into other properties.

For purposes of illustration of different aspects of the URL monitoring system 100, various types such as mandatory, moveable, and trickable are described herein. The mandatory type refers to material (e.g., a link or linked content) that cannot be skipped using trick modes. The moveable type refers to a material that can be skipped using trick modes, but will be presented when normal playback resumes. The trickable type refers to material that can be separately presented at the same time as video content item is presented using a trick mode. These types are merely representative of the available type designations that may be defined using rules and/or properties. Use of any or all of these types is not required and other types may be defined. In various implementations, the types or related properties, such as a skippable property are configured as binary flags, representing a true or false value for the type or property.

Figure 2:
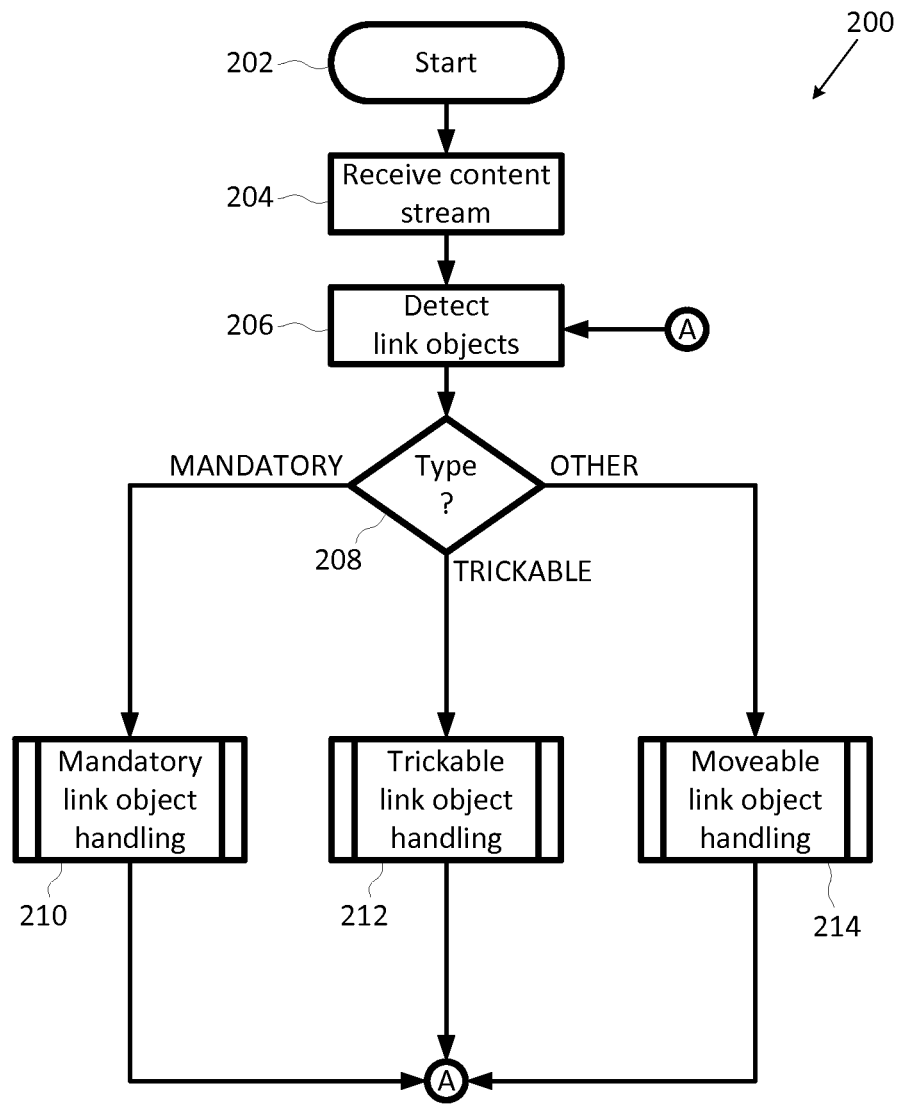
FIG. 2 is a high level flow chart of a method for URL monitoring and dynamically managing URLs from streamed content received at the endpoint device in relation to trick mode operation performed by the system of FIG. 1.

FIG. 2 illustrates aspects of the method of monitoring and dynamically managing URLs from streamed content received at the endpoint device in relation to trick mode operation. The method 200 begins with an initialization operation 202. During the initialization operation, association of link objects with the video content item, preparation of the content stream, transmission of the content stream, and any other prerequisite operations are performed. The endpoint device 106 receives and buffers the content stream as part of a content receipt operation 204.

The URL monitor 136 identifies link objects associated with the content stream in a link object detection operation 206. For example, where URLs are associated with specific positions (e.g., time stamps or frames) in the content stream and supplied in advance via metadata (e.g., a manifest), the URL monitor 136 watches the current position of the content stream for the positions associated with the URLs. Reaching or skipping the corresponding positions during presentation of the streamed content triggers the URL monitor 136 to process the link object. In other implementations, the metadata containing link objects is streamed contemporaneously with the video content item and the link object detector examine the metadata as it is received to detect and process link objects.

Upon detection of a link object, the URL monitor 136 processes the link object using information about the link object and the current view session. Information about the link object includes the URL associated with the link object and any flags, properties, or other data tied to the link object. Information about the current view session collected by the link object detector includes the current presentation mode. Link object processing begins with a type inquiry 208 in which the URL determines if the link object is subject to special link object handling.

If the link object is a mandatory link object, the link object is not skipped and is automatically displayed based on the associated rules in a mandatory link object handling operation 210. Mandatory link object handling typically forces the content viewer to display the mandatory to the link object before resuming normal playback of the video content item or with the video content item when the normal playback is resumed, depending upon the manner in which link object or linked content is configured to be displayed. For example, if the link object is configured to display content at the same time as the video content item (e.g., an overlay), the link object is displayed when normal playback of the video content item resumes. Similarly, if the link object is configured to display linked content during a break in the video content item (e.g., a commercial), the linked content is shown when normal playback resumes before the video content item is shown. In various embodiments, the URL monitor 136 controls the user interface to disable trick modes while the mandatory link object is displayed or otherwise prevent skipping of the link object.

If the link object is a trickable link object, the URL monitor 136 configures the content viewer to display the link object during the trick mode in a trickable link object handling operation 212. In the example of trickable link objects, the link or the linked content cannot be skipped using a trick mode function as it is intended to be displayed during while the video content item is presented in a trick mode. For example, trickable link objects are configured to be used to present linked content outside of the normal playback of the video content item and be displayed when trick modes are active.

Trickable link objects are optionally displayed as regular link objects as well. For example, a trickable link object may be configured to display a commercial when the link object is encountered during normal playback of the video content item. However, if the trickable link object is encountered during a trick mode or a trick mode is engaged while the commercial is being displayed (e.g., the user begins fast-forwarding through the commercial), the URL monitor 136 configures the content viewer to display the link or linked content while the video content item is presented in the background using the trick mode.

Various implementations of the URL monitor 136 utilize information about the endpoint device when configuring the display regions. On a large screen/high resolution endpoint device (e.g., a television or personal computer), the personalized URL may split the screen and display the trick mode presentation of the video content item side-by-side with the linked content. On a small screen/low resolution endpoint device (e.g., a smartphone), the personalized URL may pause playback of the video content item and use the full display of the endpoint device to show the linked content. If the user is using a companion endpoint device (e.g., a tablet computing device) with a primary endpoint device (e.g., a set-top box and attached television), the URL monitor may redirect the linked content to the companion device while the video content item continues to be shown on the primary endpoint device.

Typically, the trickable link object is displayed simultaneously while the video content item is presented in a trick mode. For example, if the link object is configured to display a user-selectable link (e.g., in an overlay) at the same time as the video content item is being fast-forwarded, the URL monitor 136 configures the content viewer to display the link object in the foreground while the video content item being fast-forwarded is visible in the background. For example, selection of linked content displayed as a low resolution (e.g., thumbnail) video content results in the video content being displayed full screen at higher resolution. When the user closes the linked content or the linked content (e.g., a commercial) is finished, the URL monitor 136 automatically resumes the presentation of the video content item using the display mode (e.g., full screen) and the trick mode that were active when the video content item was paused. Optionally, a trickable link object is also displayable during normal playback of the video content item.

Other link objects without special handling are typically considered moveable by the URL monitor 136. If moveable link objects are skipped using a trick mode, the URL monitor 136 keeps track of the skipped link objects and re-inserts some or all of the skipped link objects or substitute link objects at a later position in the content stream in a moveable link object handling operation 214. The URL monitor 136 evaluates whether to re-insert the skipped link objects or substitute link objects, how many link objects to re-insert, which link objects to re-insert, where to re-insert the link objects, and how to re-insert the link objects based on the link object parameters, business rules, and view session state. Optionally, some link objects may be designated as not moveable and ignored by the URL monitor 136.

Figure 3:
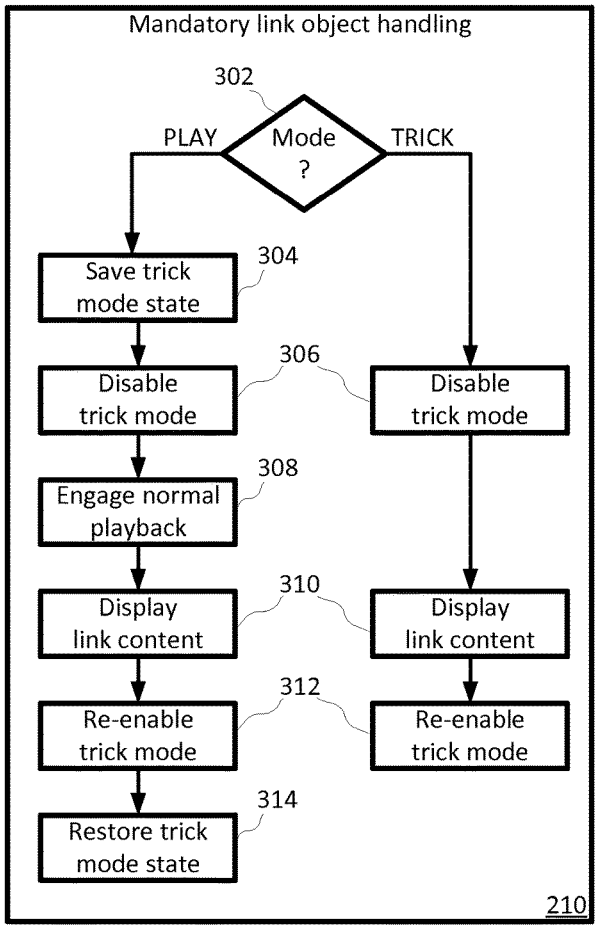
FIG. 3 is a high level flowchart illustrating aspects of one implementation of the mandatory link object handling operation.

FIG. 3 is a high level flowchart illustrating aspects of one implementation of the mandatory link object handling operation. In the example of mandatory link objects, the presentation of the link or the linked content cannot be skipped using a trick mode function. For example, a user may not use the fast-forward trick mode to skip an advertisement. Instead, some implementations of the URL monitor directly control the presentation modes of the endpoint device when a mandatory URL is detected to force display of the mandatory link object.

The mandatory link object handling operation 210 optionally begins with a presentation mode inquiry 302. The presentation mode inquiry 210 detects the currently active presentation mode (e.g., normal playback, fast-forward, rewind, or other trick mode). Suitable inquiry techniques include, without limitation, polling the presentation mode state and receiving notifications when the playback mode changes. When the current presentation mode is a normal playback mode, the link object is handled normally and displayed as configured. If the current presentation mode is a trick mode (e.g., fast-forward), the URL monitor 136 stores the link object in the memory for future playback.

The mandatory link object handling operation 210 includes saving the trick mode state in the URL monitor in a save trick mode state operation 304. The URL monitor disables access to fast-forward or other trick mode functionality in a disable trick mode control operation 306 for the period while the mandatory link object is being displayed. The duration may be specified using metadata to indicate the running time of the linked content or by a flag or another URL in the content stream that marks the end of the linked content or the start/continuation of the content stream.

If mandatory link object handling occurs while a trick mode is active, the URL monitor then switches to a normal playback mode in a set normal playback operation 308. In some instances, switching to normal playback includes pausing the current playback of the content stream. Next, the link or linked content is displayed using normal playback mode in a link object display operation 310. Following display of the mandatory link object, the URL monitor re-enables the disabled trick mode(s) in an enable trick mode operation 312. Finally, the trick mode state is restored in a restore trick mode state operation 314 to return to presentation of the content stream using the trick mode that was active when the mandatory link object was encountered.

Variations in the mandatory link object handling described above are contemplated. For example, some implementations omit the restore trick mode state operation 314 and simply remain in the normal playback mode following display of the mandatory link object. In some implementations, the save trick mode state operation 304, the set normal playback operation 308, and the restore trick mode state operation 314 may be omitted, for example, when handling mandatory link objects encountered during normal playback. Optionally, the disable trick mode control operation 306 and the enable trick mode operation 312 may be omitted in some implementations.

Figure 4:
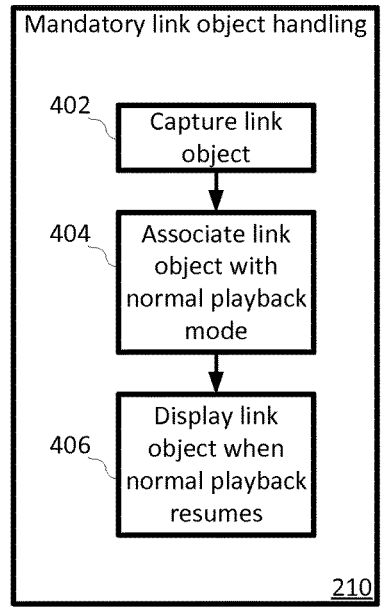
FIG. 4 is a high level flowchart illustrating aspects of an alternate implementation of the mandatory link object handling operation.

FIG. 4 is a high level flowchart illustrating aspects of an alternate implementation of the mandatory link object handling operation. In this instance, the URL monitor capture the mandatory link object skipped using the fast-forward trick mode in a link object capture operation 402. In a link object assignment operation 404, the URL monitor links the skipped mandatory link object with the resumption of normal playback. For example, the skipped mandatory link object may be linked to the play button. When normal playback resumes (e.g., the play button is pressed), the URL monitor automatically displays the link or linked content before or in conjunction with the content stream as part of a link object display operation 406. In various implementations, the mandatory link object remains linked to the play button until display is complete. In other words, the video content item cannot be viewed until display of the mandatory link object has finished in the case of secondary video content (e.g., a commercial). Or, in the case of overlay content (e.g., a banner or pop-up window), the overlay content will be displayed over the video content item until the mandatory link requirements are satisfied (e.g., displayed for a selected amount of time).

The mandatory link object handling of FIGS. 3 and 4 are not mutually exclusive and both may be selectively employed by the URL monitor. For example, the URL monitor might employ the mandatory link object handling of FIG. 3 for secondary video content and the mandatory link object handling of FIG. 4 for overlay content.

Figure 5:
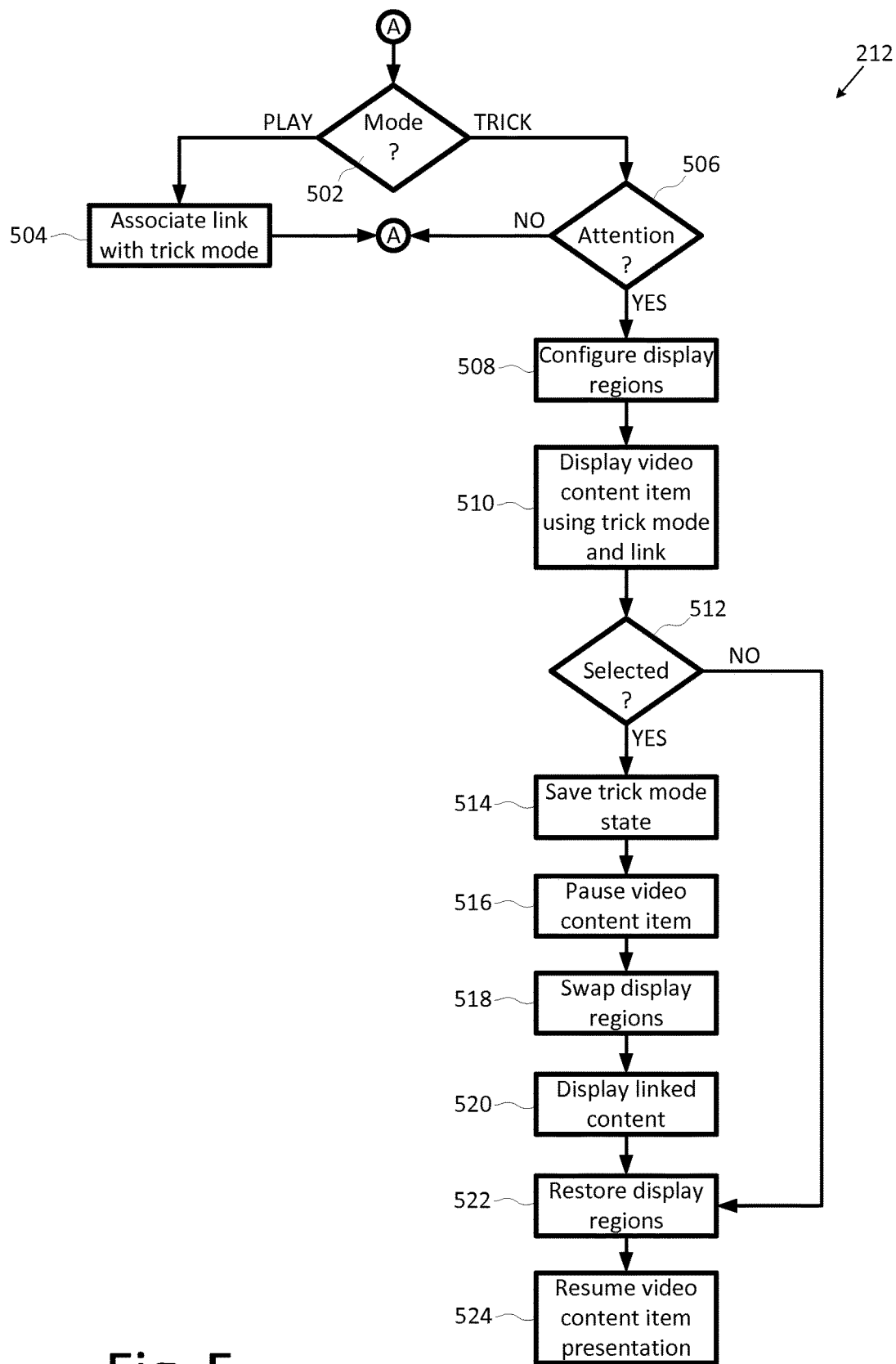
FIG. 5 is a high level flowchart illustrating aspects of one implementation of the trickable link object handling operation.

FIG. 5 is a high level flowchart illustrating aspects of one implementation of the trickable link object handling operation. The trickable link object handling operation 212 optionally begins with a presentation mode inquiry 502. If the current presentation mode is a normal playback mode, the URL manager associates the trickable link object with a selected trick mode in a mode association operation 504. For example, the trickable link object may be associated with the fast-forward mode.

When the selected trick mode is engaged (e.g., the fast-forward button is pressed), the URL manager configures the content viewer to display the trickable link object in a display configuration operation 508. Likewise, if the trickable link object is encountered during a selected trick mode (e.g., while the user is fast-forwarding the video content item), the method continues with the display configuration operation 508. In some implementations, an optional attention inquiry 506 is used to determine whether the user is paying attention to the display of the endpoint device before presenting the trickable link object.

In the display configuration operation 508, the URL monitor configures the content viewer to simultaneously display the video content item and the link or linked content associated with the trickable link object based on one or more of the link object parameters, business rules, and view session state (e.g., device capabilities). For example, link object parameters may specify how to display the link or linked content of the particular link object. Or business rules may be used to select different display configurations depending upon various factors such as, but not limited to, one or more of the endpoint device display capabilities, the type of content, and user preferences. Typically, the URL monitor configures the content viewer with two display regions. One display region is referred to as the main display region and the other is referred to as the secondary display region.

The main display region is typically, but not necessarily, larger than the secondary display region. In other words, main display region often occupies the majority of the available display area of the endpoint device and, typically, is a full screen or substantially full screen display region. The secondary display region may be configured as an overlay covering a portion of the main display region. In some implementations, the main display region is a full screen display and the secondary display region is an overly window that covers less than half of the main display region. For example, the overlay may appear as a window positioned in one quadrant of the primary display region (i.e., similar to a picture-in-picture display) or bar positioned along one edge of the primary display region (i.e., similar to a banner or headline ticker). Some implementations may arrange the main display region and the secondary display region in a side-by-side or split-screen configuration with the main display region occupying the majority of the available display area. For example, the secondary display region may be implemented as an edge banner.

In other implementations, where a companion device (i.e., a second endpoint device being used by the same user), main display region and the second display region may be displayed on different devices. For example, if the customer is using a companion endpoint device (e.g., a tablet computing device) with a primary endpoint device (e.g., a set-top box and attached television), the URL monitor may configure the content viewer with the main display region on the primary endpoint device and the secondary display region on the companion device (or vice versa).

In a dual content display operation 510, the URL monitor directs the video content item to one display region and the link or linked content to the other region. The video content item may be displayed in the main content region and a selectable link associated with the trickable link object is displayed in the secondary display region. For example, during a fast forward trick mode, a selectable link inviting customers to view additional content may be displayed in the secondary display region as the video content item is fast forwarded in the main display region. The content stream is presented in the selected trick mode and the trickable link or linked content is presented in a normal playback mode. In other words, if the trickable link object displays a selectable animated link (e.g., an animated image) or a secondary content stream (e.g., a commercial), the link or linked content is presented normally. Further, the URL monitor directs the content viewer to play an audio associated with the link or linked content.

In an optional link interaction detection operation 512, the URL monitor determines if the user interacts with the link object (e.g., link or the secondary content region) and additional content is retrieved as necessary. For example, in the case of a selectable link allow the user to view linked content, selection of the link causes the URL monitor to obtain the linked content from an linked content server identified by the associated URL.

If the link or linked content is selected, the URL monitor gives priority to the presentation of the linked content. First, the URL monitor saves the trick mode state (e.g., the trick mode and the current position in the content stream) in a save trick mode state operation 514. The URL monitor then pauses playback of the video content item at the current position in a pause operation 516.

In a display swapping operation 518, the URL monitor redirects the linked content to the main display region. In some implementations, the secondary display region is closed or hidden. In some implementations, the secondary display region remains visible and the URL monitor redirects the video content item to the secondary display region to provide visual confirmation of the state of the video content item. In other words, the video content item is subordinated but still displayed to provide the user with assurance that the current position of the video content item has not been lost. Alternatively, the display regions may be resized and/or repositioned rather than redirecting the content. In other words, the video content item stays in the main display region and the linked content stays in the secondary display region and the size and/or position of the two display regions is adjusted to give prominence to the linked content.

The linked content is displayed using normal playback mode in a link object display operation 520. Once the additional content is finished, the secondary content region is closed, or other similar event occurs, the URL monitor reconfigures the content viewer with a single display region and directs the video content item to the single display region in a display restore operation 522. In a playback resume operation 524, the URL monitor resumes playback of video content item using the trick mode that was active when the trickable link object was activated.

In a variation of the trickable link object handling operation, trick mode playback of the video content item is not paused when the secondary content is given priority. Thus, the save trick mode state operation 514, the pause operation 516, and the playback resume operation 524 are omitted.

Figure 6:
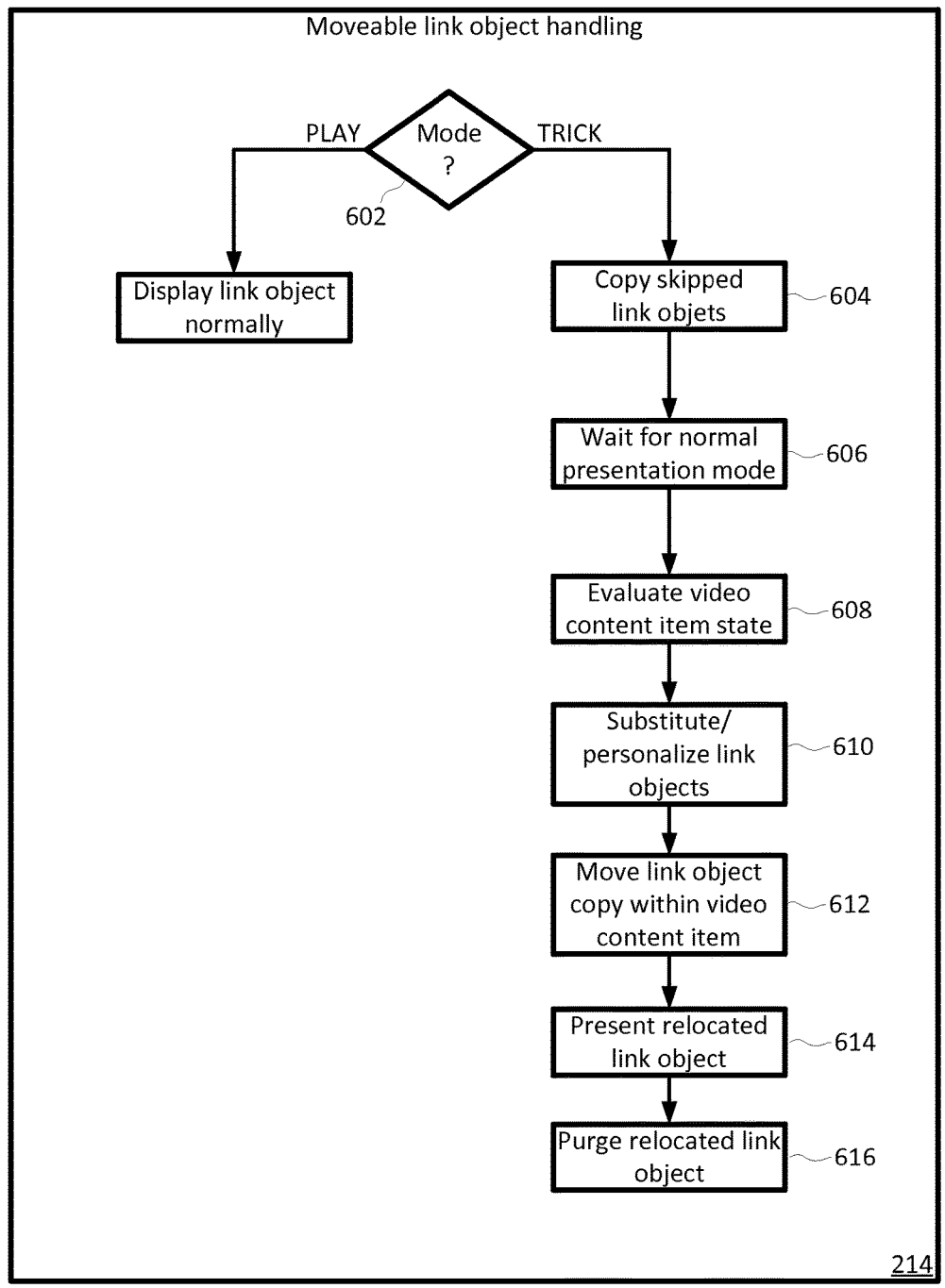
FIG. 6 is a high level flowchart illustrating aspects of one implementation of the moveable link object handling operation.

FIG. 6 is a high level flowchart illustrating aspects of one implementation of the moveable link object handling operation. The moveable link object handling operation facilitates detecting when link objects are skipped using trick modes and selectively and dynamically relocating the skipped or substitute link objects within the content stream at a new position based on some or all of a set of business rules. The skipped link object is copied from the original position within the content stream and stored temporarily while the user is utilizing trick modes to move through the video content item. When normal playback of the video content item resumes, the skipped link object or the substitute therefor is displayed to the user according to the applicable business rules and/or parameters for the link object. After the skipped link object or the substitute is presented to the user, the stored link object is discarded leaving only the original link object associated with the video content item.

The moveable link object handling operation 214 optionally begins with a presentation mode inquiry 602. If the current presentation mode is a trick mode, link objects that are not configured for special handling are bypassed without displaying the corresponding links or linked content.

As link objects are skipped, the URL monitor 136 makes a copy of the skipped link objects and any pertinent information, such as the original link objection position, as part of a skipped link object copying operation 604. For example, the URL monitor 136 may count the number of link objects that are skipped.

In a presentation mode change detection operation 606, the URL monitor 136 detects when presentation mode changes or when normal playback of the video content item is resumed. The state of the video content item and associated link objects is evaluated by the URL monitor 136 when the presentation mode changes in a state evaluation operation 608. In some implementations, the state evaluation is performed client-side (e.g., by the URL monitor associated with the endpoint device). Alternatively, the URL monitor 136 sends the relevant information to a server-side component of the URL monitoring system 100, such as the link manager 104 or a distributed server-side component of the URL monitor 136 for evaluation.

The state evaluation operation 608 evaluates various aspects of the presentation of the video content item to determine how to manage the skipped link objects. Examples of the information determined in the state evaluation operation 608 include, without limitation, the amount of time remaining in the video content item, the number link objects that were skipped, the number of link objects associated with the remainder of the video content item, the types of link objects associated with the remainder, the relation of the link objects to the remainder, and the priorities assigned to the skipped link objects and the remaining link objects.

An example of a basic evaluation is a calculation of the numbers of skipped link objects relative to the remaining time and the number of link objects that are already in place in the remainder of the video content item to determine how many skipped link objects may be relocated without stacking or overlapping more than a selected number of link objects. More sophisticated analysis may be performed in some implementations. For example, the type of link object may be evaluated when determining whether link objects may be stacked or overlapped. In the case of linked audio-visual content, stacking or overlapping link objects is typically not permissible. To the contrary, in the case of link objects displayed as static, selectable links, several link objects may be displayed during some or all of same time period without interference. Another example is where low priority link objects that have been skipped may not be moved when the number of higher priority link objects already associated with the remainder of the video content item are present (e.g., whether previously relocated or originally assigned). By way of another example, link objects determined to be closely related to the content of the remainder of the video content item (e.g., based on keywords, subject tags, target URLs, or other properties) are slated to be associated with the remainder of the video content item. The foregoing examples are intended to be representative of the available state evaluations and are not intended to limit this description.

In an optional substitution operation 610, personalized link objects are selectively substituted for the skipped link objects. Substitute URLs allow for personalization of the original link object based on the user, the view session state, or other factors. For example, when link objects are originally associated with the content stream on the server side, little or no information to personalize the link objects may be available. However, skipping a link object at the endpoint device gives the URL manager an opportunity to collect information to personalize the link object.

For example, a substitute link object having reduced display duration or linked content length may be used when the time remaining in the video content item or content stream after returning to normal playback mode is too short. Similarly, a complete different link object may be substituted when the original link object is no longer relevant. For example, a link object in a recorded program may be an advertisement for another program airing immediately after the recorded program or a time-limited sale. When watching a recorded program after the original air date, the advertisement may no longer be appropriate or applicable (e.g., the sale has ended) and a current link object may be re-inserted instead (e.g., a current sale advertisement). Additionally, substitute link objects offer an opportunity to tailor skipped link objects to the user. For example, if the user profile indicates the user is a vegetarian, a link object relating to a restaurant's hamburgers may be replaced by an alternate link object relating to vegetarian options at the restaurant. In another example, the link object that is re-inserted may differ based on whether the content stream is being watched inside the user's home or outside the user's home. Link object substitution may also be used to customize the display of the link or linked content based on the endpoint device display capabilities.

A relocation operation 612 creates associations between the skipped link objects and substitute link objects slated for relocation with selected positions in the remainder of the video content item. Copies of the skipped link objects or substitute link objects may be pushed to the client-side URL monitor for direct association with the buffered content stream (e.g., creating a virtual link object manifest by combining the original manifest with the copied link object information), storing the link objects in a location such as the URL data store 110, or dynamically sending the link objects to the endpoint device depending upon how the user interacts with the trick modes.

The relocated link object is then displayed according the applicable business rules in a display link object copy operation 614. After relocated link objects have been displayed or skipped, a purge operation 616 discards the relocated link object, leaving the only original link object at the original position.

It is generally impracticable to attempt to relocate link objects until use of trick modes ceases for an appreciable amount time. In other words, when a user continues switching between trick modes (e.g., switching between fast-forward and rewind) without, for example, returning to normal playback mode, link objects are not relocated or are relocated in small numbers (e.g., one or a few at a time) on an as needed basis.

In some implementations, one or more of the state evaluation operation 608, the substitution operation 610, and the relocation operation 612 are delayed until normal playback resumes for a minimum length of time to avoid repeatedly relocating and removing link objects. The minimum length of time is generally based on the typical time needed to perform the state evaluation operation 608, the substitution operation 610, and the relocation operation 612, the typical time to change presentation modes, and a time selected to reduce computational overhead resulting from premature link object relocation. In a typical implementation the minimum time ranges between a fraction of a second up to approximately 10 seconds. However, in many cases, the minimum time is less than five seconds. Various implementations use this minimum length as the threshold for the presentation mode change detection operation 606 before triggering the state evaluation operation 608 and subsequent operations.

As used herein, content streams broadly encompass live content streams originating from the television service provider and time-shifted content streams played back from a digital video recorder or other time-shifting device. In some implementations, when recording the video content item, the associated link objects are stored in the original positions. But, when a time-shifted content stream is played back (e.g., streamed from the digital video recorder to the endpoint device) and trick modes are used, the associated link objects are dynamically processed in the manner described herein.

The URL monitor described herein provides various mechanisms to further immerse users in a personalized interactive viewing experience. Mandatory link objects allow users to receive selected messages associated with a video content item without losing all trick mode functionality for the entire duration of the program. Moveable link objects ensure users have the opportunity to view linked content associated with a video content item.

Trickable link objects offer new opportunities to expose users to a message through linked content. For example, trickable link objects may be used to entertain or educate users while performing a mundane task of finding a position within a video content item. In addition, television service providers may sell trick mode advertising slots that give advertisers opportunities to reach consumers who use trick modes to bypass content that is not interesting to the consumer and may miss commercials appearing in traditional advertising slots. Users often do not pay attention to commercials or outright miss them because they use commercial time to take a break, get a snack, make a phone call, or the like. However, when fast-forwarding or using other trick modes to find a specific position or otherwise move around within the video content item, the user is generally forced to pay attention to the content during the trick mode in order to locate the desired position in the video content item. Accordingly, linked content displayed while a trick mode is active is likely to be viewed by the user engaging the trick mode.

Further, the URL monitoring system 100 facilitates personalization of linked content by evaluating and replacing linked content that is skipped using a trick mode with alternative content or an alternative presentation based on information collected about the current view session.

Figure 7:
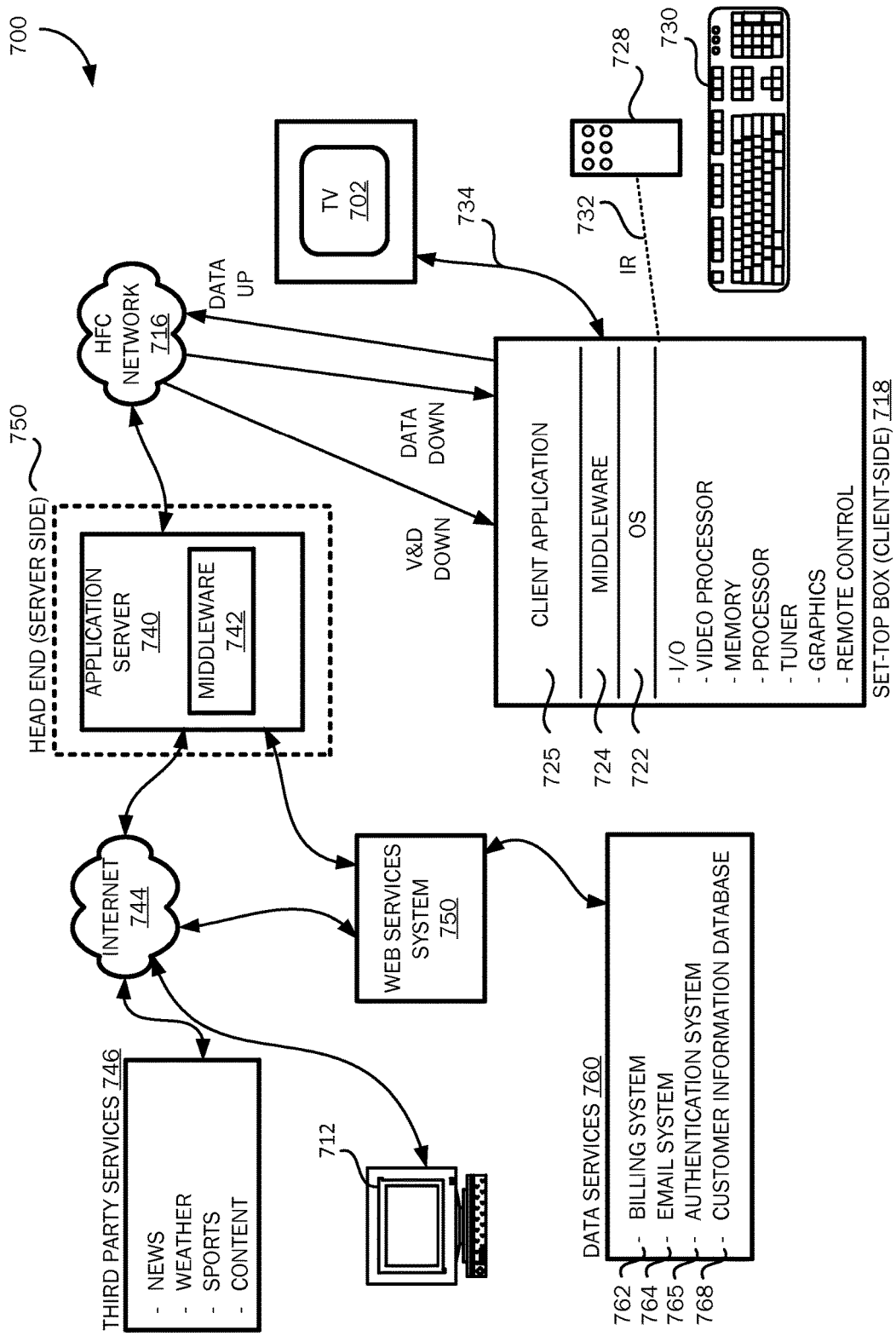
FIG. 7 is a simplified block diagram illustrating a cable television services system architecture providing an operating environment according to an embodiment of the system described herein.

FIG. 7 is a simplified block diagram illustrating one embodiment of a cable television (CATV) services system suitable for use with the present invention. As should be appreciated, a CATV services system 700 is but one of various types of systems that may be utilized for providing an operating environment for providing the functionality described herein. Digital and analog video programming, information content, and interactive television services are provided via a hybrid fiber-coax (HFC) network 716 to a television set 702 for consumption by a cable television/services system customer. As is known to those skilled in the art, HFC networks 716 combine both optical fiber and coaxial cable lines. Typically, optical fiber runs from the cable headend 710 to neighborhoods of subscribers. Coaxial cable runs from the optical fiber feeders to each customer or subscriber. The functionality of the HFC network 716 allows for efficient bidirectional data flow between the client-side set-top box 718 and the server-side application server 740 of the embodiment.

The CATV system 700 is in the form of a distributed client-server computing system for providing video and data flow across the HFC network 716 between server-side services providers (e.g., cable television/services providers) via a server-side headend 710 and a client-side customer via a client-side set-top box 718 functionally connected to a customer receiving device, such as the television set 702. As is understood by those skilled in the art, modern CATV systems 700 may provide a variety of services across the HFC network 716 including traditional digital and analog video programming, telephone services, high speed Internet access, video-on-demand, and information services.

On the client side of the CATV system 700, digital and analog video programming and digital and analog data are provided to the customer television set 702 via the set-top box 718. Interactive television services that allow a customer to input data to the CATV system 700 likewise are provided by the set-top box 718. In the illustrated embodiment, the set-top box 718 is a multipurpose computing device having a computer processor, memory, and an input/output mechanism. The input/output mechanism receives input from server-side processes via the HFC network 716 and from customers via input devices such as the remote control device 728, keyboard 730, or other computing device 712, such as a smart phone, a personal computer (e.g., a laptop or desktop), a smart television, a set-top box, a tablet/slate computer, etc. The remote control device 728 and the keyboard 730 may communicate with the television 702 or the set-top box 718 via a suitable communication transport such as the infrared connection 732. The remote control device 728 may include a biometric input module. The set-top box 718 also includes a video processor for processing and providing digital and analog video signaling to the television set 702 via a cable communication transport 734. A multi-channel tuner is provided for processing video and data to and from the set-top box 718 and the server-side headend system 750, described below.

The set-top box 718 also includes an operating system 722 for directing the functions of the set-top box 718 in conjunction with a variety of client applications 725. For example, if a client application 725 requires a news flash from a third-party news source to be displayed on the television set 702, the operating system 722 may cause the graphics functionality and video processor of the set-top box 718, for example, to output the news flash to the television set 702 at the direction of the client application 725 responsible for displaying news items.

Because a variety of different operating systems 722 may be utilized by a variety of different brands and types of set-top boxes, a middleware layer 724 may be provided to allow a given software application to be executed by a variety of different operating systems. According to an embodiment, the middleware layer 724 may include a set of application programming interfaces (APIs) that are exposed to client applications 725 and operating systems 722 that allow the client applications to communicate with the operating systems through common data calls understood via the API set. As described below, a corresponding middleware layer is included on the server side of the CATV system 700 for facilitating communication between the server-side application server 740 and the client-side set-top box 718.

The middleware layer 742 of the server-side application server 740 and the middleware layer 724 of the client-side set-top box 718 may format data passed between the client side and server side according to the Extensible Markup Language (XML).

According to one embodiment, the set-top box 718 passes digital and analog video and data signaling to the television set 702 via a one-way communication transport 734. According to other embodiments, two-way communication transports may be utilized, for example, via high definition multimedia (HDMI) ports. The set-top box 718 may receive video and data from the server side of the CATV system 700 via the HFC network 716 through a video/data downlink and data via a data downlink. The set-top box 718 may transmit data from the client side of the CATV system 700 to the server side of the CATV system 700 via the HFC network 716 via one data uplink. The video/data downlink is an in-band downlink that allows for digital and analog video and data signaling from the server side of the CATV system 700 through the HFC network 716 to the set-top box 718 for use by the set-top box 718 and for distribution to the television set 702. The in-band signaling space operates in a specified frequency range that is generally divided into channels. Each channel may carry one or more signals, for example, a single analog signal or multiple digital signals.

The data downlink and the data uplink between the HFC network 716 and the set-top box 718 comprise out-of-band data links. The out-of-band frequency range is generally lower than the frequency range used for in-band signaling. Data flow between the client-side set-top box 718 and the server-side application server 740 is typically passed through the out-of-band data links. Alternatively, an in-band data carousel may be positioned in an in-band channel into which a data feed may be processed from the server-side application server 740 through the HFC network 716 to the client-side set-top box 718. Operation of data transport between components of the CATV system 700 is well known to those skilled in the art.

The headend 710 of the CATV system 700 is positioned on the server side of the CATV system and includes hardware and software systems responsible for originating and managing content for distributing through the HFC network 716 to client-side set-top boxes 718 for presentation to customers via television set 702. As described above, a number of services may be provided by the CATV system 700, including digital and analog video programming, interactive television services, telephone services, video-on-demand services, targeted advertising, and provision of information content.

The application server 740 is a computing system operative to assemble and manage data sent to and received from the client-side set-top box 718 via the HFC network 716. As described above with reference to the set-top box 718, the application server 740 includes a middleware layer 742 for processing and preparing data from the headend of the CATV system 700 for receipt and use by the client-side set-top box 718. For example, the application server 740 via the middleware layer 742 may obtain data, such as content metadata, from third-party services 746 via the Internet 744 for transmitting to a customer through the HFC network 716 and the set-top box 718. When the application server 740 receives the downloaded content metadata, the middleware layer 742 may be utilized to format the content metadata for receipt and use by the set-top box 718. Therefore, content metadata may be sent and categorized based on the availability to the customer's program guide data.

According to one embodiment, data obtained and managed by the middleware layer 742 of the application server 740 is formatted according to the Extensible Markup Language and is passed to the set-top box 718 through the HFC network 716 where the XML-formatted data may be utilized by a client application 725 in concert with the middleware layer 724, as described above. As should be appreciated by those skilled in the art, a variety of third-party services data, including news data, weather data, sports data and other information content may be obtained by the application server 740 via distributed computing environments such as the Internet 744 for provision to customers via the HFC network 716 and the set-top box 718. According to embodiments, client application 725 may include the user agent described herein.

According to embodiments, the application server 740 obtains customer support services data, including billing data, information on customer work order state, answers to frequently asked questions, services provider contact information, and the like from data services 760 for provision to the customer via an interactive television session. In the illustrated embodiment, the services provider data services 760 include a number of services operated by the services provider of the CATV system 700 which may include data on a given customer, including and without limitation, a billing system 762, an e-mail system 764, an authentication system 765, and a customer information database 768.

The billing system 762 may include information such as a customer's name, street address, business identification number, Social Security number, credit history, and information regarding services and products subscribed to by the customer. According to embodiments, the billing system 762 may also include billing data for services and products subscribed to by the customer for bill processing, billing presentment, and payment receipt.

The customer information database 768 may include general information about customers such as place of employment, business address, business telephone number, and demographic information such as age, gender, educational level, and the like. The customer information database 768 may also include information on pending work orders for services or products ordered by the customer. The customer information database 768 may also include general customer information such as answers to frequently asked customer questions and contact information for various service provider offices/departments. As should be understood, this information may be stored in a variety of disparate databases operated by the cable services provider.

A web services system 750 serves as a collection point for data requested from the various data services systems 760. According to embodiments, when the application server 740 requires customer services data from one or more of the data services, the application server 740 passes a data query to the web services system 750. The web services system formulates a data query to each of the available data services systems 760 for obtaining any required data for a requesting customer as identified by a set-top box identification associated with the customer. The web services system 750 serves as an abstraction layer between the various data services systems 760 and the application server 740. That is, the application server 740 is not required to communicate with the disparate data services systems 760, nor is the application server 740 required to understand the data structures or data types utilized by the disparate data services systems 760. The web services system 750 is operative to communicate with each of the disparate data services systems 760 for obtaining necessary customer data. The customer data obtained by the web services system is assembled and is returned to the application server 740 for ultimate processing via the middleware layer 742, as described above.

The e-mail system 764 may include information such as user names, e-mail addresses, e-mail messages, passwords, contact names, and contact e-mail addresses associated with e-mail accounts allocated to users by the services provider in association with subscriber IDs. The authentication system 765 may include information such as secure user names, subscriber profiles, subscriber IDs, and passwords utilized by customers for access to network services. As should be understood by those skilled in the art, the disparate systems 762, 764, 765, 768 may be integrated or provided in any combination of separate systems, of which the illustrated embodiment is only one example.

Figure 8:
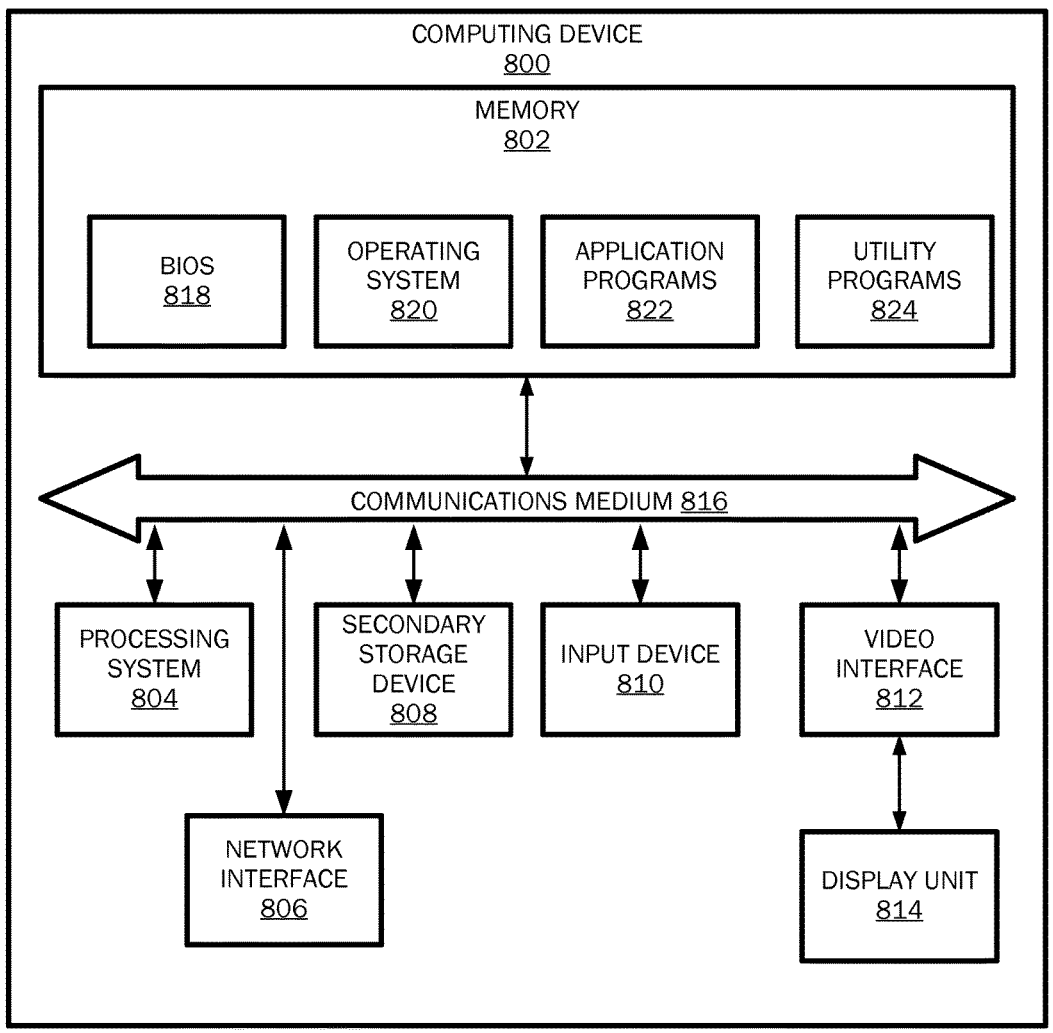
FIG. 8 is a block diagram illustrating example physical components of a computing device with which embodiments of the system described herein may be practiced.

FIG. 8 is a simplified block diagram illustrating example physical components of a computing device 800 with which embodiments of the system 100 may be practiced. In some embodiments, one or more of the components of system 100 may be implemented using one or more computing devices like the computing device 800. It should be appreciated that in other embodiments, components of system 100 may be implemented using computing devices having hardware components other than those illustrated in the illustrated embodiment.

Computing devices may be implemented in different ways in different embodiments. For instance, in the illustrated embodiment, the computing device 800 includes a processing system 804, memory 802, a network interface 806, a secondary storage device 808, an input device 810, a video interface 812, a display unit 814, and a communication medium 816. In other embodiments, the computing device 800 may be implemented using more or fewer hardware components (e.g., a video interface, a display unit, or an input device) or in combination with other types of computer systems and program modules.

The processing system 804 includes one or more processing units, which may include tangible integrated circuits that selectively execute computer-executable instructions. In various embodiments, the processing units in the processing system 804 are implemented in various ways. For example, the processing units in the processing system 804 can be implemented as one or more processing cores. In another example, the processing system 804 can comprise one or more separate microprocessors. In yet another example embodiment, the processing system 804 can comprise Application-Specific Integrated Circuits (ASICs) that provide specific functionality. In yet another example, the processing system 804 provides specific functionality by using an ASIC and by executing computer-executable instructions.

Memory 802 and secondary storage device 808 may store computer-readable information, such as, but not limited to, computer-executable instructions (e.g., programs), data structures, and/or data. The processing system 804 may perform an I/O operation to retrieve the computer-readable information from the secondary storage device 808. According to one embodiment, any of the applications of the system 100 may be may be stored locally on computing device 800. Thus, memory 802 and/or secondary storage device 808 may store the computer-executable instructions that, when executed by processor 804, provide the functionality described herein via the system 100.

In various embodiments, memory 802 and secondary storage device 808 may be implemented as various types of computer-readable storage media. Computer-readable storage media broadly encompasses removable and non-removable devices, media, and other articles of manufacture, which may be implemented in various methods or technologies, providing for volatile or nonvolatile storage and retrieval of computer-readable information. As used herein, computer-readable media includes computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), magnetic disks, magnetic tape drives, CD-ROM discs, DVD-ROM discs, and Blu-Ray discs.

The computing device 800 may be enabled to send data to and receive data from a communication network via a network interface card 806. In different embodiments, the network interface card 806 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The input device 810 enables the computing device 800 to receive input from a user. Example types of input devices include, but are not limited to, keyboards, mice, trackballs, stylus input devices, keypads, microphones, joysticks, touch-sensitive display screens, and other types of devices that provide user input to the computing device 800.

The video interface 812 outputs video information to the display unit 814. In different embodiments, the video interface 812 is implemented in different ways. For example, the video interface 812 is a video expansion card. In another example, the video interface 812 is integrated into a motherboard of the computing device 800. In various embodiments, the display unit 814 can be a an LCD display panel, a touch-sensitive display panel, an LED screen, a projector, a cathode-ray tube display, or another type of display unit. In various embodiments, the video interface 812 communicates with the display unit 814 in various ways. For example, the video interface 812 can communicate with the display unit 814 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 816 facilitates communication among the hardware components of the computing device 800. In different embodiments, the communications medium 816 facilitates communication among different components of the computing device 800. For instance, in the illustrated embodiment, the communications medium 816 facilitates communication among the memory 802, the processing system 804, the network interface card 806, the secondary storage device 808, the input device 810, and the video interface 812. In different embodiments, the communications medium 816 is implemented in different ways, such as a PCI bus, a PCI Express bus, an Accelerated Graphics Port (AGP) bus, an InfiniBand interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The memory 802 stores various types of data and/or software instructions. For instance, in the illustrated embodiment, the memory 802 stores a Basic Input/Output System (BIOS) 818, and an operating system 820. The BIOS 818 includes a set of software instructions that, when executed by the processing system 804, cause the computing device 800 to boot up. The operating system 820 includes a set of software instructions that, when executed by the processing system 804, cause the computing device 800 to provide an operating system that coordinates the activities and sharing of resources of the computing device 800. The memory 802 also stores one or more application programs 822 that, when executed by the processing system 804, cause the computing device 800 to provide applications to users. The memory 802 also stores one or more utility programs 824 that, when executed by the processing system 804, cause the computing device 800 to provide utilities to other software programs.

Embodiments of the present invention may be utilized in various distributed computing environments where tasks are performed by remote processing devices that are linked through a communications network in a distributed computing environment.

FIGS. 9A and 9B illustrate a suitable mobile computing environment, for example, a mobile computing device, a smart phone, a laptop computer, a tablet personal computer, and the like, with which embodiments may be practiced. The mobile computing device 900 is illustrative of any suitable device operative to send, receive, and process wireless communications according to embodiments of the present invention. A display screen 905 is operative for displaying a variety of information such as information about incoming and outgoing communications, as well as, a variety of data and displayable objects, for example, text, alphanumeric data, photographs, and the like.

Data input to the device 900 may be performed via a variety of suitable means, such as, touch screen input via the display screen 905, keyboard or keypad input via a data entry area 910, key input via one or more selectable buttons or controls 915, voice input via a microphone 920 disposed on the device 900, photographic input via a camera 925 functionality associated with the mobile computing device, or any other suitable input means. Data may be output via the device 900 via any suitable output means, including but not limited to, display on the display screen 905, audible output via an associated speaker 930 or connected earphone system, vibration module for providing tactile output, and the like.

Referring now to FIG. 9B, operational unit 935 is illustrative of internal operating functionality of the mobile computing device 900. A processor 940 is illustrative of a general purpose computer processor for processing incoming and outgoing data and communications and controlling operation of the device and associated software applications via a mobile computing device operating system. Memory 945 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the client application may be stored locally on mobile computing device 900.

Mobile computing device 900 may contain an accelerometer 955 for detecting acceleration, and can be used to sense orientation, vibration, and/or shock. Mobile computing device 900 may contain a global positioning system (GPS) system (e.g., GPS send/receive functionality) 960. A GPS system 960 uses radio waves to communicate with satellites orbiting the Earth. Some GPS-enabled mobile computing devices use wireless-assisted GPS to determine the device's location, wherein the device uses orbiting GPS satellites in conjunction with information about the device's mobile phone signal. Radio functions 950 include all required functionality, including onboard antennae, for allowing the device 900 to communicate with other communication devices and systems via a wireless network. Radio functions 950 may be utilized to communicate with a wireless or a WI-FI positioning system to determine the location of a device 900.

Although described herein in combination with mobile computing device 900, in alternative embodiments the invention may be used in combination with any number of computer systems, such as in desktop environments, laptop or notebook computer systems, multiprocessor systems, microprocessor-based or programmable customer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to flowcharts and/or operational illustrations of methods, systems, and computer program products according to embodiments. The functions/acts noted in the blocks may occur out of the order as shown in any flowchart or described herein with reference to the Figures. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A uniform resource locator (URL) monitoring system for dynamically managing presentation of link objects associated with a video content item in a content stream when using trick modes, the URL monitoring system comprising:
   an endpoint device having a display; a receiver receiving the content stream; a buffer storing the received content stream;
   a link processor detecting and parsing the link objects in the content stream including parsing each link object to determine corresponding link object properties and a link object type for each link object selected from a trickable link object type, a mandatory link object type, and a moveable link object type, detecting when link objects are skipped using trick modes, and maintaining, the view session state; and a rule memory storing business rules that determine link handling operations based on the trickable link object type, the mandatory link object type, and the moveable link object type including not skipping and automatically displaying a mandatory link object as part of a mandatory link object handling operation, displaying a trickable link object during a trick mode while simultaneously displaying the video content item as part of a trickable link object handling operation, and tracking a moveable link object and reinserting the moveable link object or substituting a personalized link object as part of a moveable link object handling operation.

2. The URL monitoring system of claim 1 wherein the link processor determines when normal playback occurs for a selected length of time following use of the trick mode.

3. The URL monitoring system of claim 2 wherein the link manager determines which of the skipped link objects to associate with a subsequent position in the video content item only after normal playback occurs for the selected length of time following use of the trick mode.

4. The URL monitoring system of claim 1 wherein a determination of whether to associate skipped link objects with a subsequent position in the video content item when normal playback resumes is based on at least one of the number of skipped link objects and the number of link objects remaining in the video content item.

5. The URL monitoring system of claim 1 wherein the link processor counts the number of link objects skipped using the trick mode.

6. The URL monitoring system of claim 1 further comprising a camera in communication with an attention monitor to determine when a user is looking at the endpoint device.

7. A method of automatically and dynamically managing uniform resource locators (URLs) associated with a video content item during viewing of the video content item using a URL monitoring system, the method comprising the acts of:
displaying the video content item via a content viewer of an endpoint device;
determining a current presentation mode for the video content item being displayed via the content viewer;
detecting a link object associated with the video content item via the endpoint device, the link object pointing to linked content;
parsing the link object to determine whether the link object is of a trickable link object type, a mandatory link object type, and a moveable link object type; and
determining link handling operations based on the trickable link object type, the mandatory link object type, and the moveable link object type including not skipping and automatically displaying a mandatory link object as part of a mandatory link object handling operation, displaying a trickable link object during a trick mode while simultaneously displaying the video content item as part of a trickable link object handling operation, and tracking a moveable link object and reinserting the moveable link object or substituting a personalized link object as part of a moveable link object handling operation.

8. The method of claim 7 further comprising the acts of:
detecting that the link object has been selected;
pausing presentation of the video content item; and
displaying the linked content associated with the link object.

9. The method of claim 8 further comprising the act of resuming presentation of the video content item using a selected trick mode after displaying the linked content.

10. The method of claim 7 further comprising the act of disabling trick modes in the content viewer to prevent the linked content from being skipped when the link object is the mandatory link object type.

11. The method of claim 7 further comprising the act of automatically switching to a normal playback mode when the current presentation mode of the video content item is a forward trick mode and the link object is the mandatory link object type.

12. A non-transitory computer readable storage medium that includes instructions which, when executed, perform the acts of:
displaying a video content item via a content viewer of an endpoint device;
determining a current presentation mode for the video content item being displayed via the content viewer;
detecting a link object associated with the video content item via the endpoint device, the link object pointing to linked content;
parsing the link object to determine whether the link object is of a trickable link object type, a mandatory link object type, and a moveable link object type; and
determining link handling operations based on the trickable link object type, the mandatory link object type, and the moveable link object type including not skipping and automatically displaying a mandatory link object as part of a mandatory link object handling operation, displaying a trickable link object during a trick mode while simultaneously displaying the video content item as part of a trickable link object handling operation, and tracking a moveable link object and reinserting the moveable link object or substituting a personalized link object as part of a moveable link object handling operation.

13. The non-transitory computer readable storage medium of claim 12 further comprising the acts of: if the current presentation mode is a normal playback mode:
disabling a selected trick mode to prevent the selected trick mode from being activated;
displaying the linked content associated with the link object; and
enabling the selected trick mode when displaying the linked content is finished to allow the selected trick mode to be activated as desired.

14. The non-transitory computer readable storage medium of claim 12 wherein the link object includes a property indicating whether the link object may be skipped using the trick mode.

15. The non-transitory computer readable storage medium of claim 12 wherein the link object is associated with a first position in the video content item, further comprising the acts of:
if the link object is skippable and the current presentation mode is the trick mode:
skipping display of the link object at the first position while the current presentation mode is the trick mode;
copying the skipped link object;
detecting that the normal playback mode has been selected as the current presentation mode;
calculating the current position of the video content item where normal playback is resumed;

associating the copied link object with a second position in the video content item, the second position being a position in the video content item equal or subsequent to the position where normal playback is resumed; and displaying the linked content associated with the copied link object upon reaching the second position in the video content item during normal playback.

16. The non-transitory computer readable storage medium of claim 12 further comprising the act of detecting when the trick mode is selected while the linked content associated with the link object is being displayed.

17. The non-transitory computer readable storage medium of claim 12 wherein the link object includes a property indicating whether the link object is displayable during the trick mode applied to the video content item.

18. The non-transitory computer readable storage medium of claim 12 further comprising the acts of:

determining whether the link object is displayable while the trick mode is applied to the video content item; and if the current presentation mode is the trick mode and the link object is displayable while the trick mode is applied to the video content item:

configuring the content viewer of the endpoint device with a first content region and a second content region;

presenting the video content item in the first content region using the trick mode; and presenting the link object in the second content region at the same time the video content item is displayed in the first content region using the trick mode.

19. The non-transitory computer readable storage medium of claim 18 wherein the link object is displayed as a selectable link in the second content region, further comprising the acts of:

detecting that the link object has been selected; displaying the linked content in the first content region;

displaying the video content item in the second content region while the linked content is being displayed; and displaying the video content item in the first content region after finishing displaying the linked content.

20. The non-transitory computer readable storage medium of claim 19 further comprising the acts of:

automatically pausing playback of the video content item after detecting that the link object has been selected; and automatically unpausing the video content item and resuming playback of the video content item using the trick mode after finishing displaying the linked content.

* * * * *